(12) United States Patent
Payne

(10) Patent No.: US 9,033,629 B2
(45) Date of Patent: May 19, 2015

(54) APPARATUS AND METHOD FOR APPLYING AN UNDERLAYMENT LAYER TO TRUCKING CARGO

(76) Inventor: Fred V. Payne, Augustine, FL (US)

( * ) Notice: Subject to any disclaimer, the term of this patent is extended or adjusted under 35 U.S.C. 154(b) by 1175 days.

(21) Appl. No.: 12/123,671

(22) Filed: May 20, 2008

(65) Prior Publication Data

US 2009/0289142 A1   Nov. 26, 2009

(51) Int. Cl.
*B60P 7/08* (2006.01)
*B65B 11/08* (2006.01)
*B60P 7/04* (2006.01)

(52) U.S. Cl.
CPC . *B65B 11/08* (2013.01); *B60P 7/04* (2013.01); *B60P 7/0876* (2013.01)

(58) Field of Classification Search
CPC .......... B60P 7/0876; B60P 7/04; B65B 11/08
USPC ................... 242/919, 557, 403, 598.5, 598.1; 410/97, 98; 414/392, 607; 296/98, 296/100.01; 212/326, 328, 166, 325, 319
See application file for complete search history.

(56) References Cited

U.S. PATENT DOCUMENTS

| | | | |
|---|---|---|---|
| 4,842,323 A * | 6/1989 | Trickett | |
| 5,713,712 A | 2/1998 | McIntyre | |
| 5,964,236 A | 10/1999 | Berke | |
| 6,502,709 B1 | 1/2003 | Parker | |
| 6,634,850 B2 | 10/2003 | Christensen | |
| 6,695,382 B2 | 2/2004 | Ciferri et al. | |
| 6,811,202 B2 | 11/2004 | Hornady | |
| 7,182,387 B2 | 2/2007 | Hartman et al. | |
| 7,189,042 B1 * | 3/2007 | Schmit | .......................... 410/100 |
| 2002/0043816 A1 | 4/2002 | Johnston | |
| 2004/0239142 A1 | 12/2004 | Poyntz | |

* cited by examiner

*Primary Examiner* — Stephen Gordon
(74) *Attorney, Agent, or Firm* — The Bilicki Law Firm, P.C.; Rebecca M. K. Tapscott

(57) ABSTRACT

An apparatus and method for applying an underlayment layer to trucking cargo are provided. The underlayment layer may be formed into a roll with a rod disposed therethrough. The roll may be supported by a frame. The roll can be configured to move vertically with respect to the ground. A trailer carrying trucking cargo can be stationed beneath the frame. The underlayment layer may unwound and dispensed from the roll. In order to drape the trucking cargo with the underlayment layer, the roll may be moved horizontally over the frame in addition to or alternatively to having the trucking cargo driven horizontally with respect to the roll.

11 Claims, 11 Drawing Sheets

APPARATUS AND METHOD FOR APPLYING AN UNDERLAYMENT LAYER TO TRUCKING CARGO

DETAILED DESCRIPTION

Figure 1:
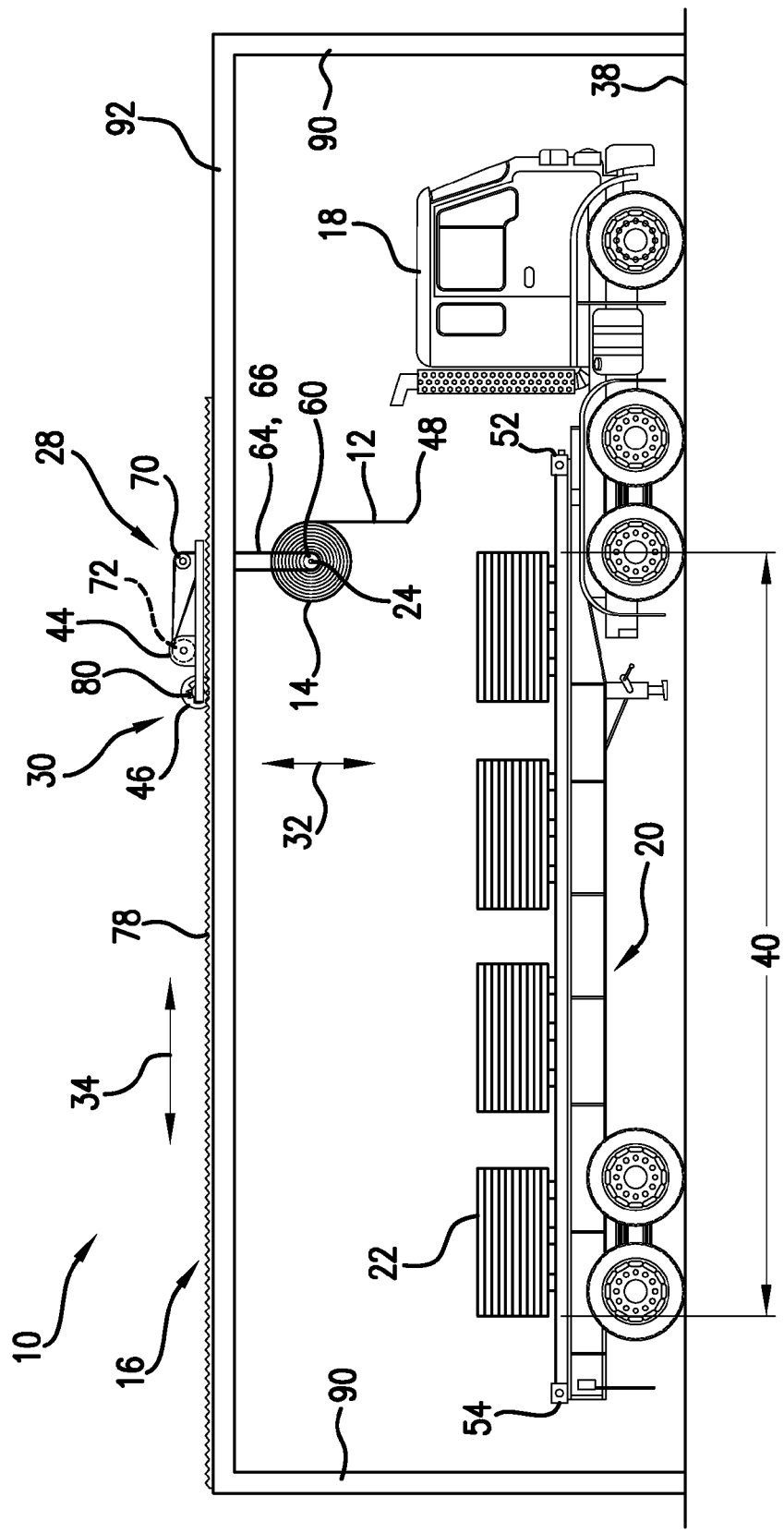
FIG. 1 is a side view of an apparatus for applying an underlayment layer to trucking cargo, in accordance with an exemplary embodiment.

Each embodiment of the present invention provides for an apparatus 10 and method for applying an underlayment layer 12 to a trucking cargo 22. This can be done without requiring a person climb on the trailer 20 carrying the trucking cargo 22 or on top of the trucking cargo 22 to apply the underlayment layer 12 thereto. Such an arrangement may thus increase user safety related to the application of an underlayment layer 12 to trucking cargo 22. The underlayment layer 12 acts as an additional barrier and hence protects the trucking cargo 22 from natural elements. A tarp or other protective member may alternatively be added on top of the underlayment layer 12 to further protect the trucking cargo 22 during transport. The underlayment layer 12 may be made of a suitable material, for example plastic or the like, for providing the necessary protection to the trucking cargo 22. The term trucking cargo 22 used through out the description refers to any load which is being transported by a heavy vehicle. Reference will now be made in detail to the embodiments of the invention, examples of which are illustrated in the drawings.

Prior to being applied to the trucking cargo 22, the underlayment layer 12 can be formed into a continuous roll 14 by being folded towards its center, once or a number of times. The underlayment layer 12, without limitation, is 20 feet wide. It may be folded 4 times towards its center to make it 5 feet wide. However, it is to be understood that the underlayment layer 12 can be of a different size and folded any number of times as contemplated within the scope of the invention. The apparatus 10 comprises the roll 14 of the underlayment layer 12 thus formed and a rod 24. The rod 24 is disposed through the roll 14 of underlayment layer 12. According to one exemplary embodiment, as seen in FIG. 1, the roll 14 of the underlayment layer 12 may be supported by a frame 16.

In accordance with certain exemplary embodiments, the roll 14 may be five feet wide and the rod 24 may be sixteen feet wide. Any number of rolls may be placed on the rod 24. For example, two rolls 14 of dissimilar width can be placed onto the rod 24 so that the apparatus 10 can dispense underlayment layers 12 of different widths. The rolls 14 can be moved from side to side on the rod 24 as desired for proper alignment. In another arrangement, three rolls 14 can be used. The rolls 14 can be perforated or unperforated so that added functionality may be realized. Additional arrangments are possible in which one or more rods 24 can be used. Here, for example, three rods 24 can be present so that one rod 24 hangs from another.

Frame 16 may be a free standing structure positioned on the ground 38. The free standing structure 16, without limitation, may comprise of a plurality of vertical support members 90 attached to a top rectangular frame 92. The free standing structure 16 may optionally be provided with wheels or other rotating elements, below the vertical support members 90 to make it portable.

Figure 2:
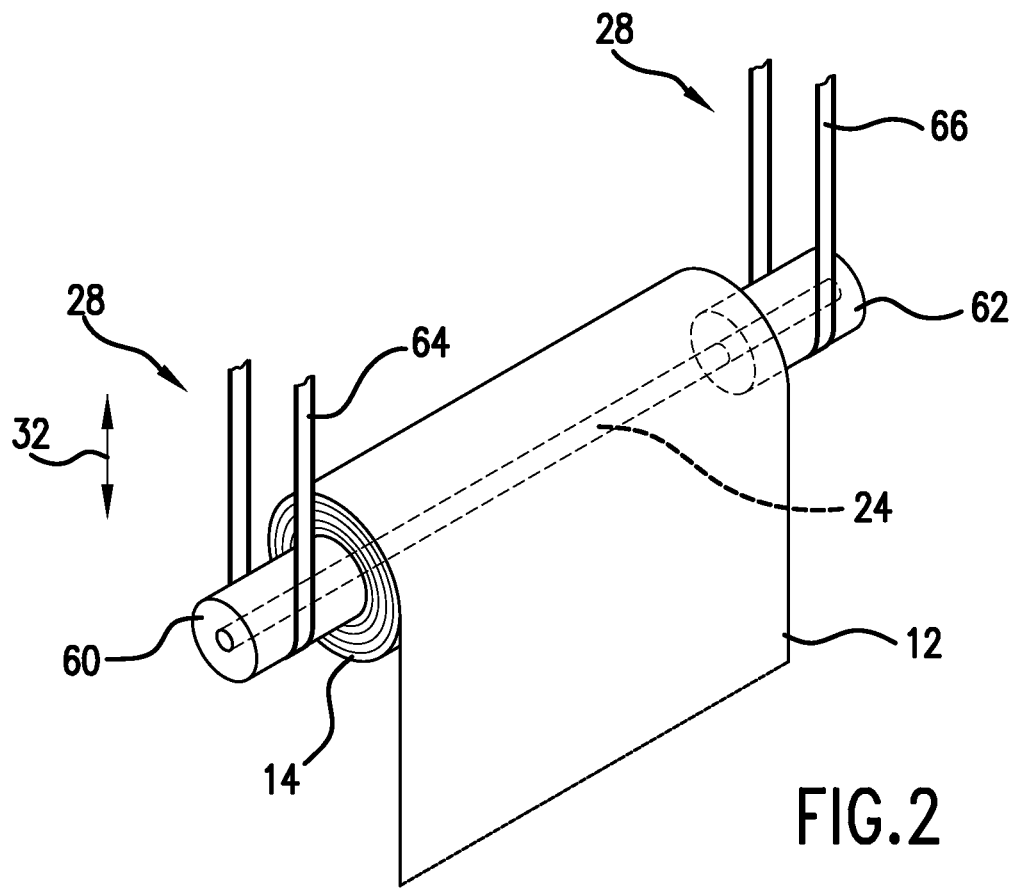
FIG. 2 is a perspective view of the roll of the underlayment layer of the exemplary embodiment of FIG. 1.

FIG. 2 illustrates a perspective view of the roll 14 of the underlayment layer 12 loaded on rod 24. The roll 14 may be suspended from the top rectangular frame 92 by a pair of straps 64 and 66, or a pair of cables or the like. A pair of drums 60 and 62 may be located on opposite ends of the rod 24. The drums 60 and 62 can be supported by the pair of straps 64 and 66. The straps 64 and 66 may be flexible in nature. The roll 14 can be configured to be moved vertically with respect to the ground 38 such that the roll 14 of the underlayment layer 12 can move closer to and farther from the ground 38. The vertical bidirectional movement of the roll 14 in the vertical direction 32 is achieved by the use of a vertical driving mechanism 28.

Figure 3:
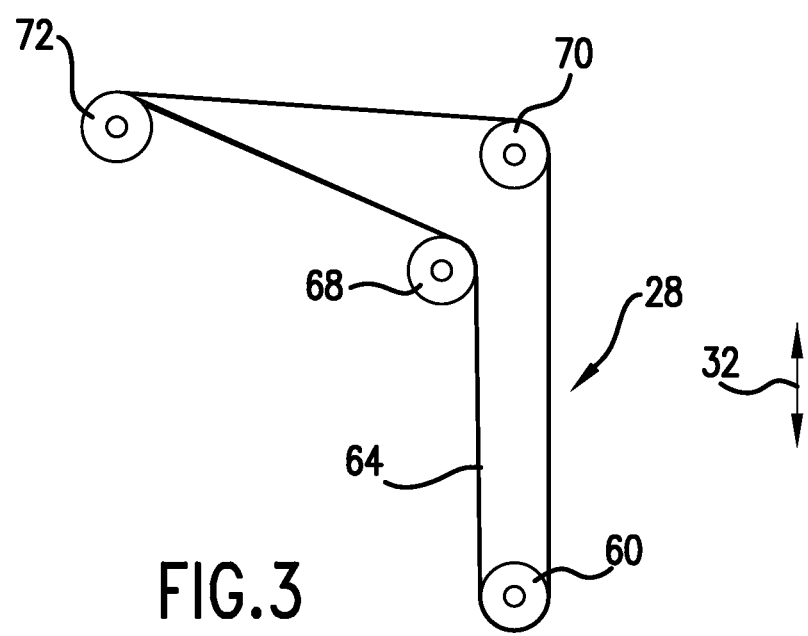
FIG. 3 is the side view of a vertical driving mechanism of the apparatus of FIG. 2.

Referring to FIG. 3, which illustrates a side view of the vertical driving mechanism 28, the strap 64 extends around a first directional roller 68, drum 60 and a second directional roller 70. A take-up roller 72 can be used to wrap the strap 64 around thereon. The take-up roller 72 can be rotated clockwise or counter-clockwise by the use of a vertical driving motor 44 (illustrated in FIG. 4). As the take-up roller 72 is rotated, strap 64 winds around take-up roller 72 and hence the drum 60 is elevated. Rotating the take-up roller 72 in the opposite direction causes the strap 64 to unwind therefrom and thus lowering of the drum 60. In a similar manner, drum 62 can be raised and lowered as the take-up roller 72 rotates.

Figure 4:
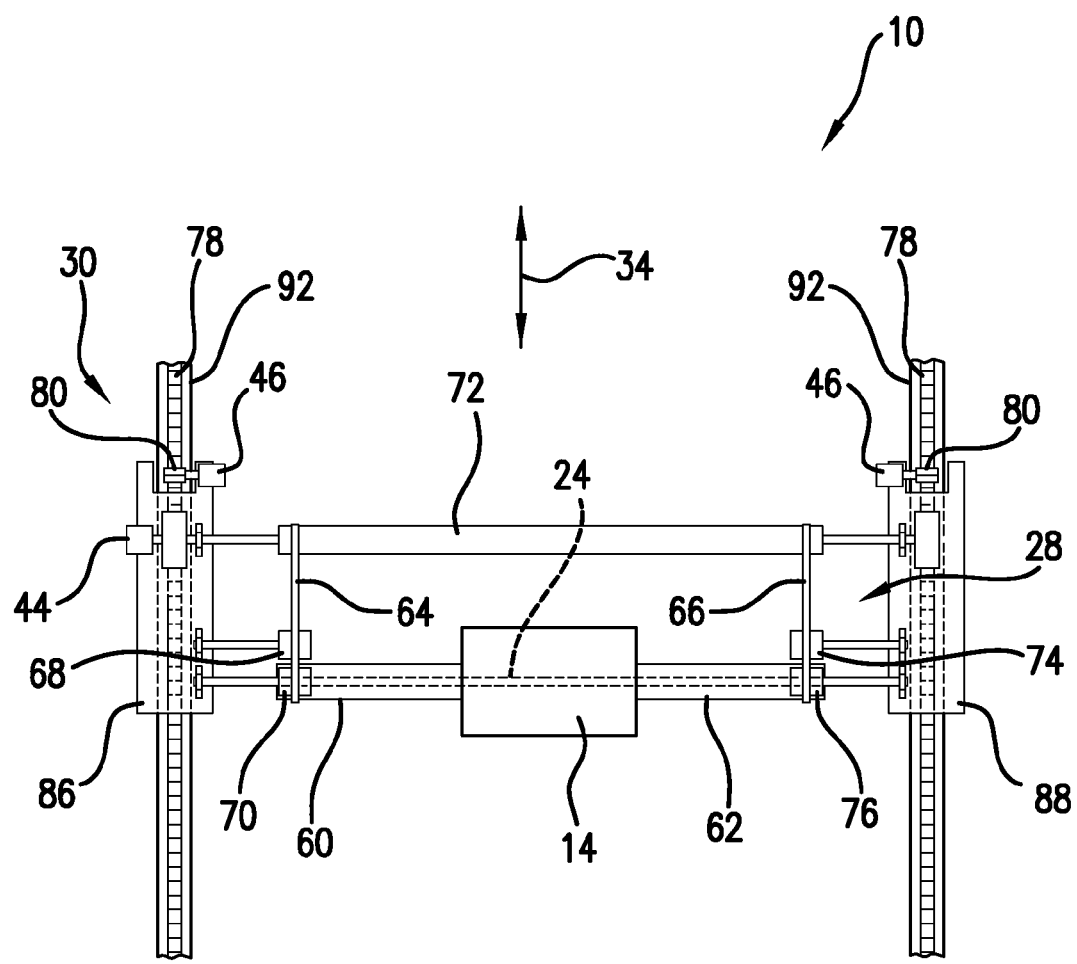
FIG. 4 is a top view of a portion of the apparatus of the exemplary embodiment of FIG. 1, illustrating a horizontal driving mechanism.

Referring to FIG. 4, the strap 66, which extends around the directional rollers 74 and 76, winds around the take-up roller 72 as it is rotated by the vertical driving motor 44. Thus, as the take-up roller 72 is rotated by the vertical driving motor 44, the drums 60 and 62 are raised or lowered. This causes the roll 14 to be moved vertically with respect to the free standing structure 16 so that the roll 14 moves closer to and farther from the ground 38.

Although described as being capable of being moved in the vertical direction 32, it is to be understood that other exemplary embodiments are possible in which the roll 14 does not move in the vertical direction 32. For example, the roll 14 may be located a particular height from the ground, and the leading edge 48 can be grasped so as to dispense the underlayment layer 12 from roll 14.

When the frame 16 is a free standing structure, the roll 14 can be configured to move horizontally with respect to the free standing structure 16. As illustrated in FIG. 4, a horizontal driving mechanism 30 may be employed to achieve the horizontal movement of roll 14. Racks 78 may be present on the top rectangular frame 92 of the free standing structure 16. The racks 78 may be fixedly or removably attached upon the top rectangular frame 92 by means of bolts or other fastening elements. The racks 78 extend along the length of the top rectangular frame 92. The horizontal driving mechanism 30 has a pair of pinions 80 which compliment the racks 78 and are capable of meshing therewith. The pinions 80 can be driven by horizontal driving motors 46. The pinions 80 may be fixedly or removably attached to a pair of platforms 86 and 88 by means of bolts or other fastening elements. The platforms 86 and 88 support the take-up roller 72 thereon. As the pinions 80 are driven by the horizontal driving motors 46, the pinions 80 move along the lengths of the racks 78. The movement of the pinions 80 causes the platforms 86 and 88 to move horizontally along the racks 78 in the horizontal direction 34. Hence, the take-up roller 72 and the roll 14, along with the directional rollers 68, 70, 74 and 76 may move horizontally along racks 78.

Figure 5:
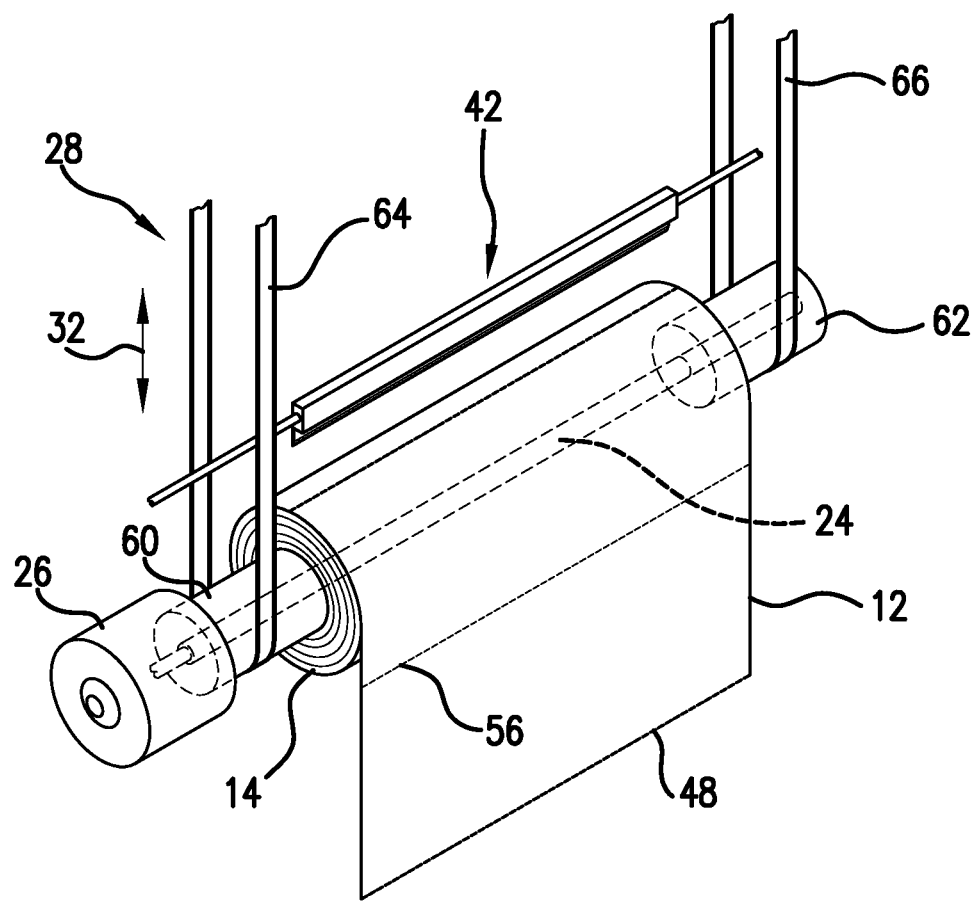
FIG. 5 is a perspective view of the roll of underlayment layer with a driving motor and a cutting mechanism added to the exemplary embodiment of FIG. 1.

FIG. 5 illustrates an exemplary embodiment in which rod 24 is driven by means of a motor 26. This rotation results in the winding and unwinding of the underlayment layer 12 depending upon the direction of rotation of the rod 24. Thus, simultaneous operation of the motor 26 and the horizontal driving motor 46 are possible to result in dispensing of the underlayment layer 12 roll 14 while roll 14 moves horizontally along the racks 78. After a desired length of the underlayment layer 12 is dispensed from the roll 14, the underlayment layer 12 may be cut at a desired position by means of a cutting mechanism 42. The cutting mechanism 42 may be an automatic cutting mechanism in accordance with one exemplary embodiment. The cutting mechanism 42 may employ any suitable means capable of cutting the underlayment layer 12. In other arrangements, a cutting mechanism 42 need not be present. For example, a utility knife or the like could be used in order to cut the underlayment layer 12. However, it is to be understood that in alternate embodiments the underlayment layer 12 may have perforations 56 defined at predetermined lengths to facilitate easy tearing or cutting of the underlayment layer 12 without the need of a cutting mechanism 42.

Figure 6:
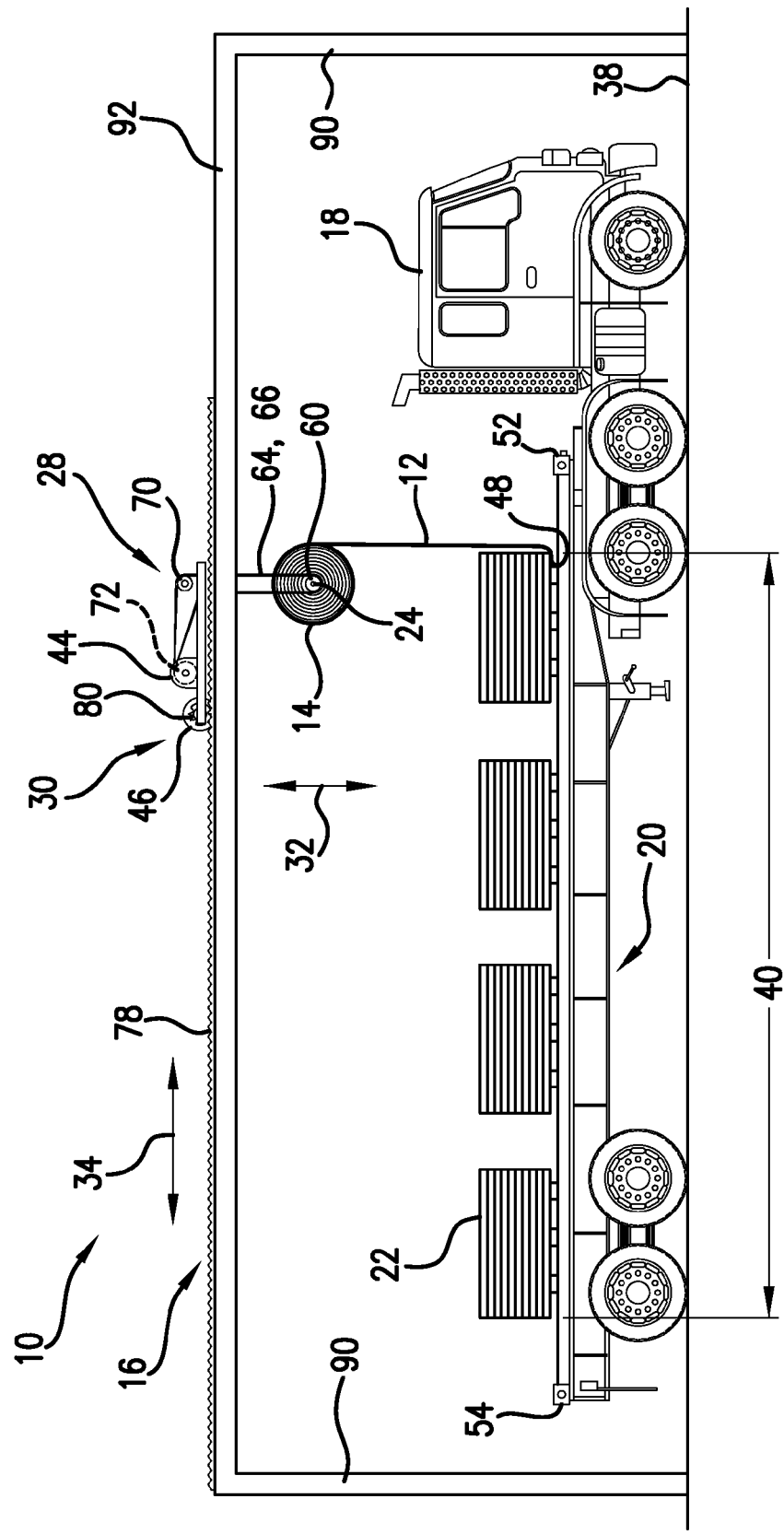
FIG. 6, FIG. 8 and FIG. 9 are side views of the apparatus of FIG. 1 illustrating various steps involved in the method of applying an underlayment layer to the trucking cargo.
Figure 7:
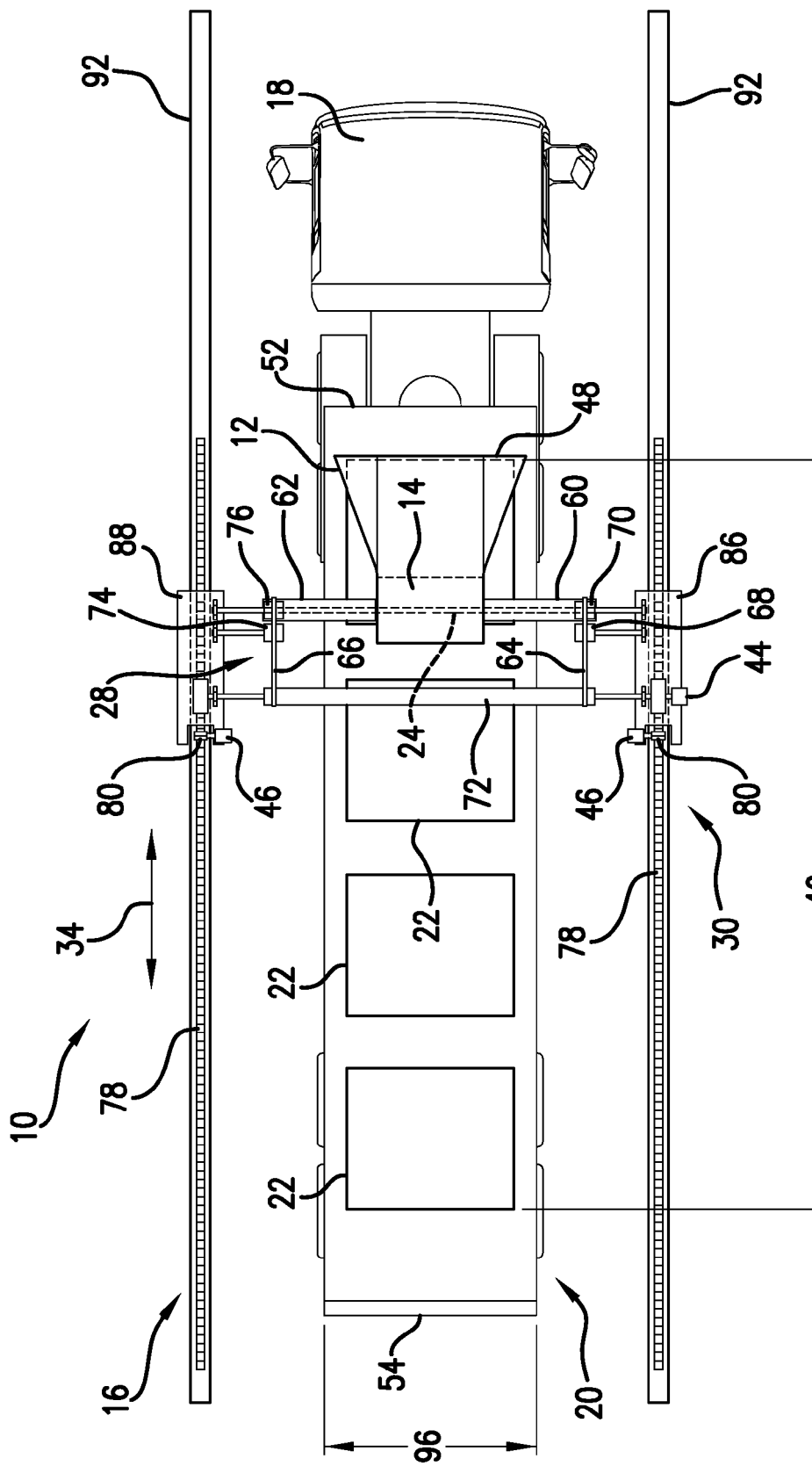
FIG. 7 is a top view of the apparatus of FIG. 1 illustrating a step involved in the method of applying an underlayment layer to the trucking cargo.

Referring back to FIG. 1, a trailer 20 loaded with a trucking cargo 22 is driven by a cab 18 and positioned beneath the free standing structure 16. The rod 24 carrying the roll 14 of underlayment layer 12 is supported by the free standing structure 16. The trailer 20 is stationed on the ground 38 such that the roll 14 is positioned proximate to the front 52 of the trailer 20. As the vertical driving mechanism 28 (FIG. 2 and FIG. 3) is energized, the roll 14 is lowered to allow an operator to reach the roll 14. As illustrated in FIG. 6 and FIG. 7, the roll 14 is lowered to a level which allows the operator to be able to pull a leading edge 48 of the underlayment layer 12 and secure it to the trailer 20. The leading edge 48 can be secured at a position proximate to a front 52 of the trailer 20. The operator may be personnel or any automated mechanism configured to secure the leading edge 48 proximate to the front 52 of the trailer 20.

The leading edge 48 may be secured to the trailer 20 by various means. For example, the underlayment layer 12 can be tied at the sides of the trailer 20. Additionally or alternatively, adhesives may be used to effect such an attachment. The underlayment layer 12 can be wide enough to accommodate the entire width 96 of the trucking cargo 22. As soon as the operator pulls the leading edge 48 of the underlayment layer 12, the rod 24 is rotated by the motor 26 (seen in FIG. 5), causing the underlayment layer 12 to be dispensed from the roll 14.

After the leading edge 48 of the underlayment layer 12 is secured to the trailer 20, the horizontal driving mechanism 30 is activated. Activation of the horizontal driving mechanism results in the movement of roll 14 in a horizontal plane parallel to the ground 38 along the length of the free standing structure 16 (as illustrated in FIG. 4). The roll 14 moves along racks 78 from a position proximate to the front 52 towards the back 54 of trailer 20. Also, the roll 14 is raised to a sufficient height to ensure that the horizontal movement of the roll 14 is not hindered by the trucking cargo 22.

Figure 8:
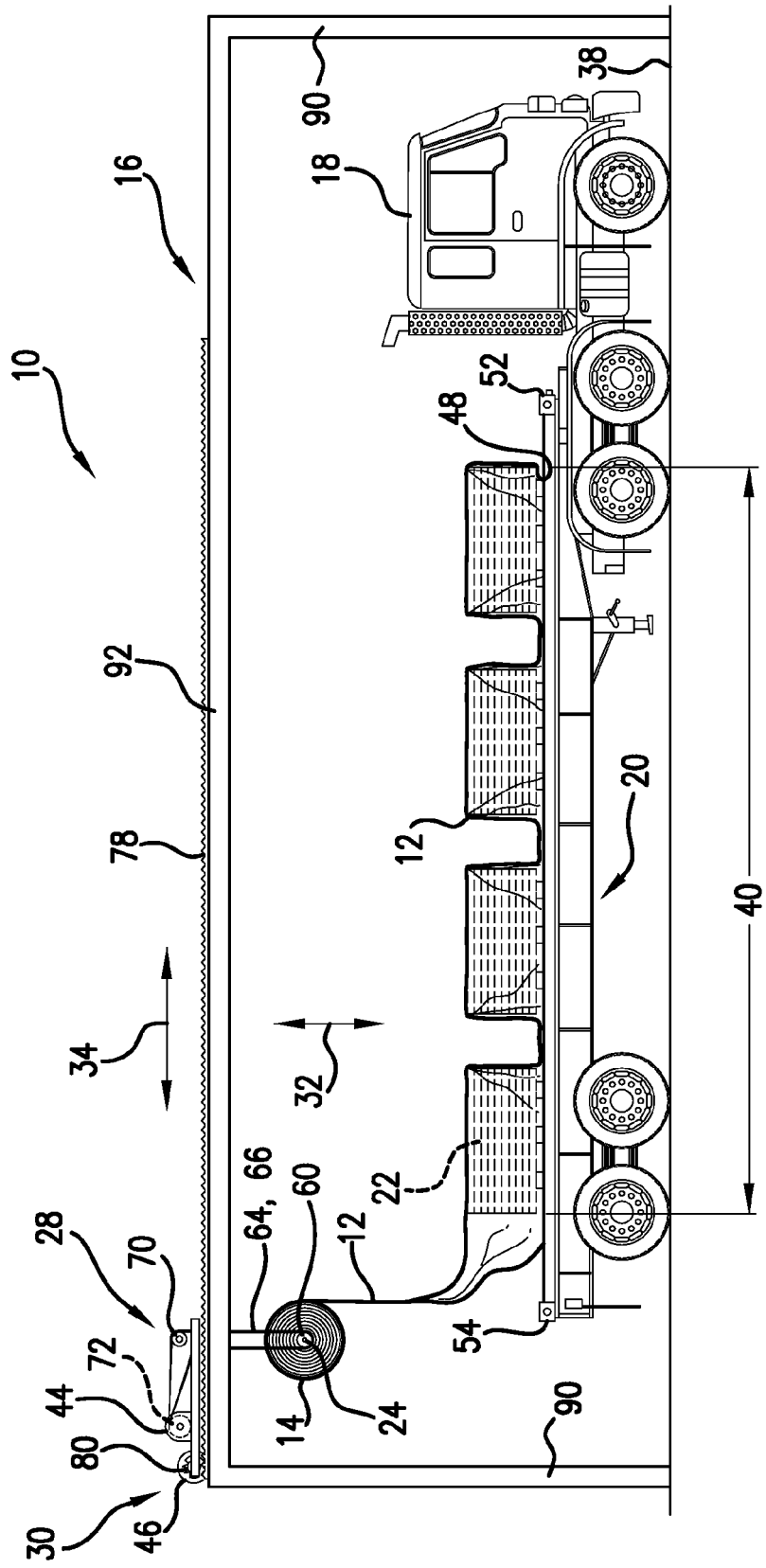

While the roll 14 moves in a horizontal plane, the underlayment layer 12 is unfolded from the roll 14 so that the trucking cargo 22 positioned underneath may be draped with the underlayment layer 12. Referring to FIG. 8, the dispensed length of the underlayment layer 12 is sufficient to drape the entire length 40 of the trucking cargo 22. However, it is to be understood that other arrangements are possible in which the underlayment layer 12 is not positioned over the entire length 40 of trucking cargo 22. Thereafter, the underlayment layer 12 is cut at a desired position, by the use of the cutting mechanism 42 illustrated in FIG. 5.

Figure 9:
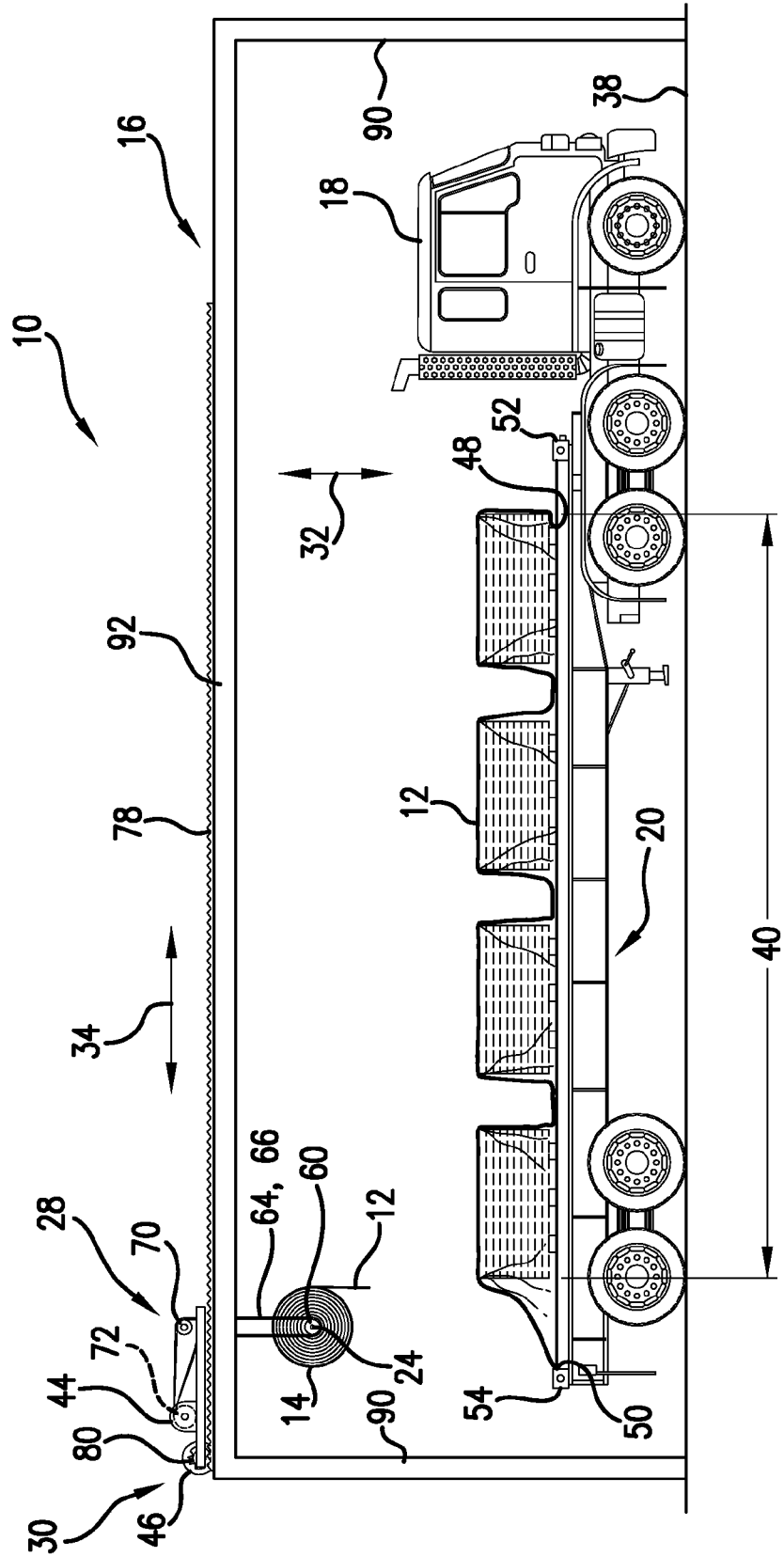

As illustrated in FIG. 9, after the underlayment layer 12 is detached from the roll 14, the trailing edge 50 of the underlayment layer 12 is secured to the back 54 of the trailer 20. The trailing edge 50 of the underlayment layer 12 may either be tied at the back 54 of the trailer 20 or secured using tape or other conventional adhesives capable of holding the underlayment layer 12 in place. The trucking cargo 22 may be fully covered by the underlayment layer 12.

The motors 26, 44 and 46 may be gear motors of 1½ HP. Motors of various types and powers may be used in other embodiments depending upon the weight and requirement of the underlayment layer 12. The vertical driving mechanism 28 and the horizontal driving mechanism 30 may be operated by an electric drive system, a hydraulic drive system, a pneumatic drive system or any other type of drive system.

A second embodiment of the apparatus is explained hereinafter. The second embodiment is similar to the first embodiment described hereinabove except that the present embodiment facilitates applying the underlayment layer 12 to the trucking cargo 22 when the horizontal drive mechanism 30 is not present or is inoperative. The present embodiment utilizes the horizontal movement of the trailer 20 with respect to the free standing structure 16 to completely cover the trucking cargo 22. This eliminates the need for the horizontal movement of the rod 24 and the horizontal driving mechanism 30 used in the first embodiment. As in the first embodiment, the vertical driving mechanism 28 ensures the smooth lifting or lowering of the roll 14 closer to and farther from the ground 38. The trailer 20 may be parked directly below the free standing structure 16. In this regard, the roll 14 is positioned proximate to the front 52 of the trailer 20. The roll 14 may be lowered to allow the operator to pull the leading edge 48 of the underlayment layer 12. The proximity of the roll 14 to the front 52 of the trailer 20 enables the operator to conveniently secure the leading edge 48 of the underlayment layer 12 thereto. Thereafter, the roll 14 can be raised above the height of the trucking cargo 22.

Figure 10:
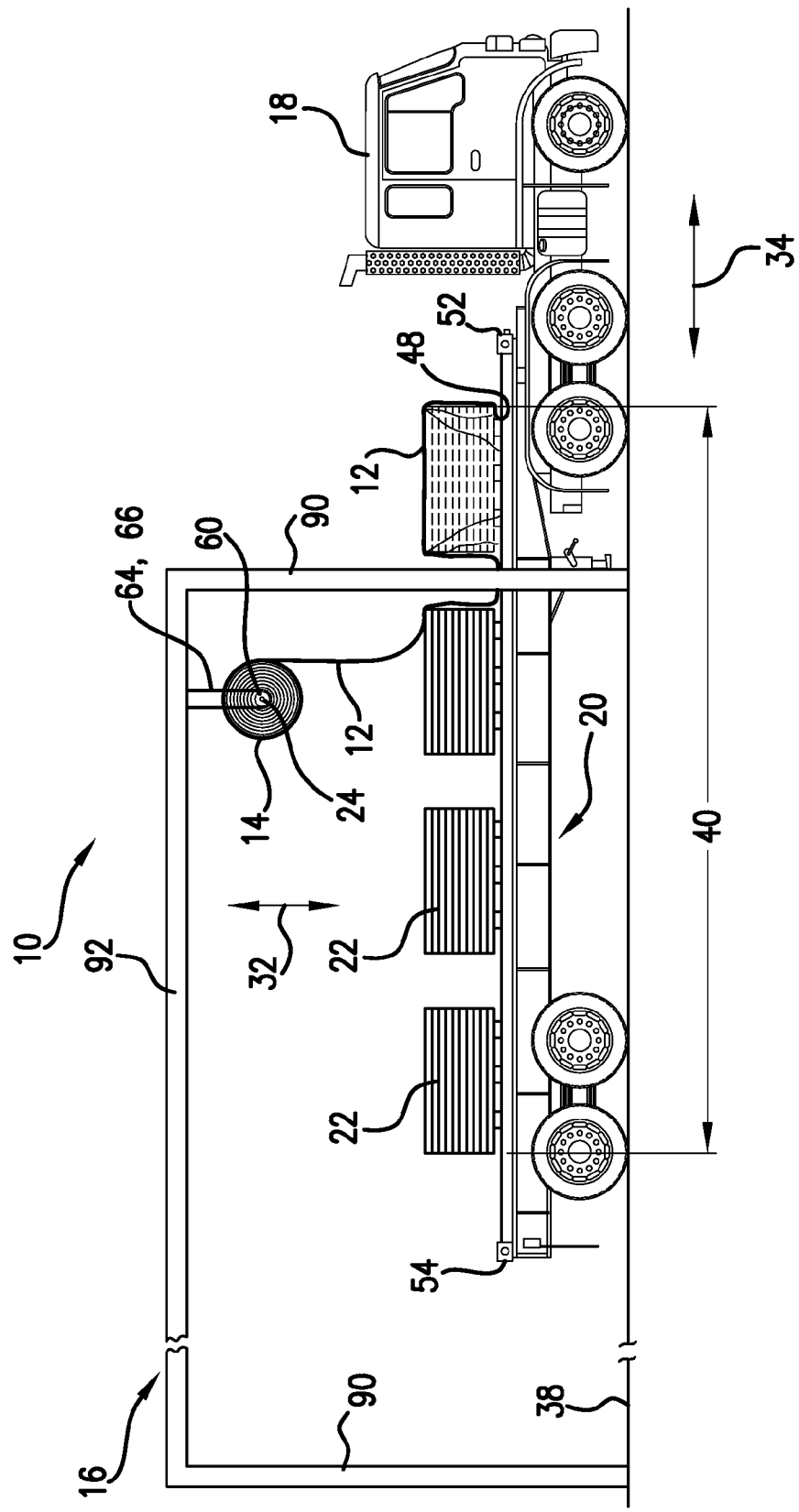
FIG. 10 is a side view of an apparatus for applying an underlayment layer to a trucking cargo, in accordance with another exemplary embodiment.

As illustrated in FIG. 10, the trailer 20 is then driven forward in the horizontal direction 34. The roll 14 is raised to a sufficient height which allows the trucking cargo 22 to be driven beneath the free standing structure 16, without hitting the roll 14. As the trailer 20 moves forward in the horizontal direction 34, the leading edge 48 of the underlayment layer 12 is pulled and the underlayment layer 12 is further dispensed from the roll 14 over the trucking cargo 22. The trucking cargo 22 driven beneath the free standing structure 16 is draped by the dispensed underlayment layer 12. The underlayment layer 12 is wide enough to accommodate the width 96 of the trucking cargo 22. The speed of the trailer 20, and hence of the trucking cargo 22, should be controlled to ensure uniform and smooth draping of the trucking cargo 22. It may be contemplated that in certain situations alternative methods of covering the trucking cargo 22 could be used. For example, in accordance with one alternative embodiment, the horizontal movement of the trucking cargo 22 may be utilized in conjunction with the horizontal movement of the roll 14 used in the first embodiment.

Figure 11:
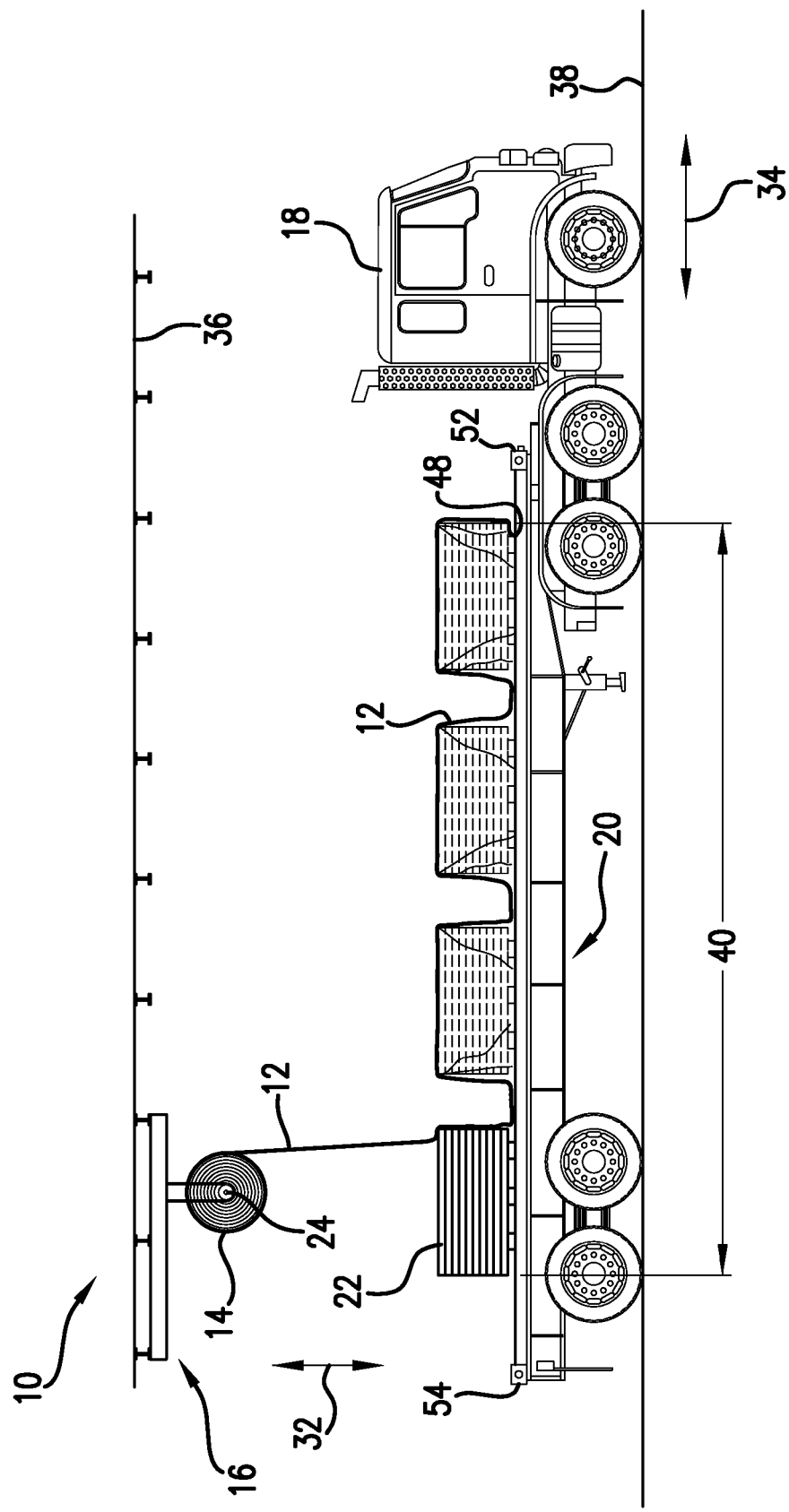
FIG. 11 is a side view of an apparatus for applying an underlayment layer to a trucking cargo, in accordance with yet another exemplary embodiment.

A third embodiment of the apparatus 10 is illustrated in FIG. 11. In this exemplary embodiment, the roll 14 of underlayment layer 12 is supported by the frame 16. Frame 16 may be attached to a ceiling 36. The trucking cargo 22 to be covered is parked directly beneath frame 16. The rod 24 carrying the roll 14 is then rotated to unwind the underlayment layer 12 from the roll 14. A sufficient length of the underlayment layer 12 is unfolded and dispensed from the roll 14, such that the operator is able to reach the leading edge 48 of the underlayment layer 12. As the roll 14 mounted on the frame 16 is situated more proximate to the front 52 of the trailer 20, the operator conveniently secures the leading edge 48 of underlayment layer 12 thereto.

As in the second embodiment, the trucking cargo 22 is driven horizontally relative to the frame 16 in the horizontal direction 34 depicted in FIG. 11. As the trailer 20 moves forward in the horizontal direction 34, the leading edge 48 of the underlayment layer 12 is pulled and the underlayment layer 12 is further dispensed from the roll 14 over the trucking cargo 22. The trucking cargo 22 being driven beneath the frame 16 is draped by the dispensed underlayment layer 12 which is wide enough to accommodate the width 96 of the trucking cargo 22. The speed of the trailer 20 and hence of the trucking cargo 22 should be controlled to ensure uniform and smooth draping of the trucking cargo 22.

The roll 14 may be motorized so that it can rotate in order to dispense the underlayment layer 12. Alternatively, the roll 14 need not arranged so that it is automatically driven. Instead, the roll 14 can rotate freely on rod 24 or another mechanism due to forces being applied to the underlayment layer 12. In this regard, the underlayment layer 12 can be pulled from the roll 14 without automatically rotating the roll 14. Other embodiments are possible in which the underlayment layer 12 is dispensed from the roll 14 through both a combination of pulling of underlayment layer 12 and a rotation of the roll 14.

Figure 12:
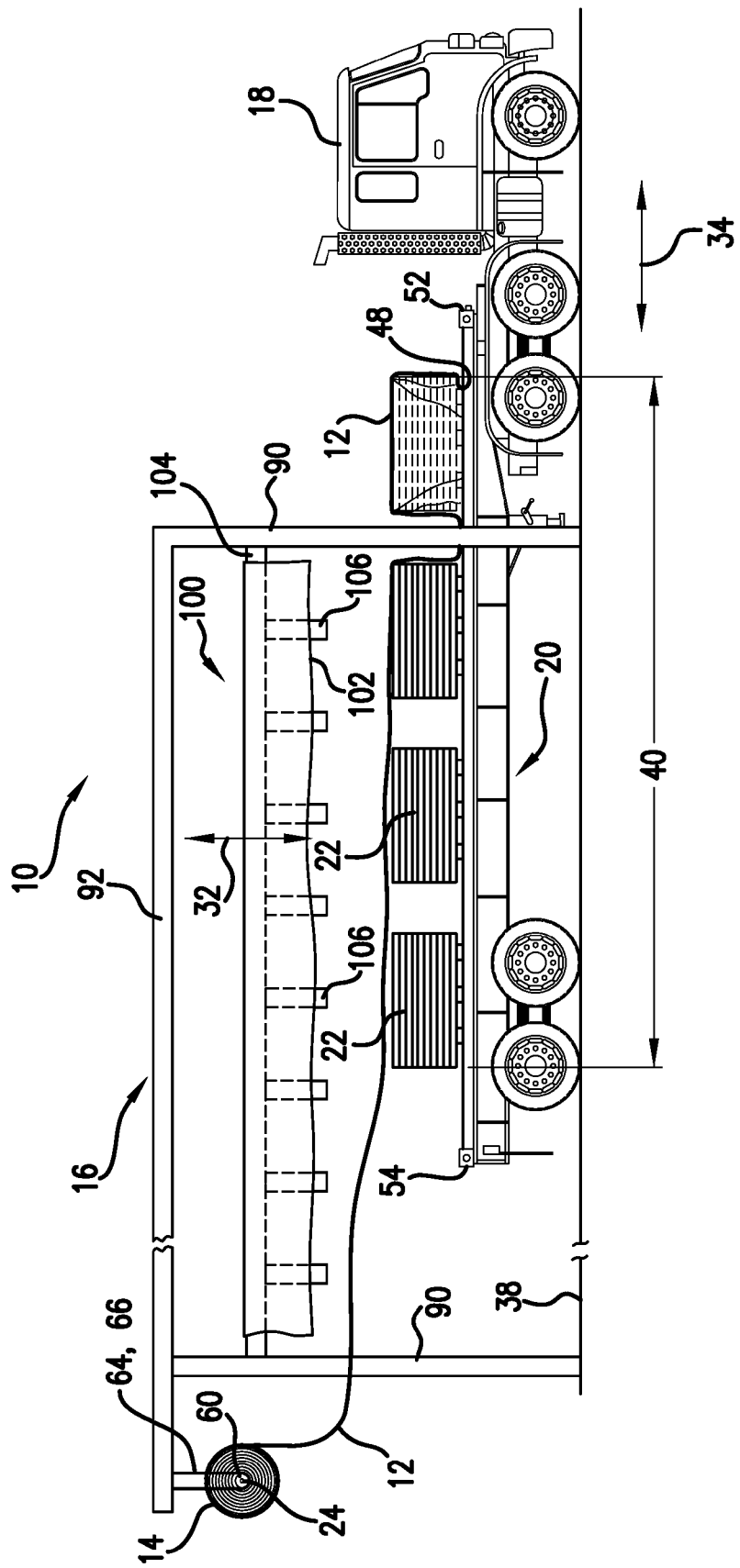
FIG. 12 is a side view of the apparatus for applying an underlayment layer that also includes tarp application, in accordance with another exemplary embodiment.

FIG. 12 illustrates an alternative exemplary embodiment of the apparatus 10. Here, a roll 14 is positioned at the front portion of the frame 16 and extends in the longitudinal direction from the vertical support member 90 so that the vehicle first encounters the roll 14 before the trucking cargo 22 is positioned between the vertical support members 90. The underlayment layer 12 can be attached to the trailer 20 and/or trucking cargo 22 and the trailer 20 can be moved from left to right in FIG. 12 so that the underlayment layer 12 is rolled from the rod 24 and applied to the trucking cargo 22 in the longitudinal direction from the front to the back of the trucking cargo 22.

The roll 14 may be arranged so that it can move vertically with respect to the ground but not horizontally with respect to the ground. This arrangement allows the leading edge 48 of the underlayment layer 12 to be placed into proper position for attachment. The roll 14 may spin freely on the rod 24 so that the underlayment layer 12 can be pulled therefrom without having to be motor driven.

The arrangement in FIG. 12 also includes a tarp application member 100 that is supported by the frame 16. The tarp application member 100 can be used to apply a tarp 102 to the trucking cargo 22 after the underlayment layer 12 is applied to the trucking cargo 22. In this regard, the tarp application member 100 has a tarp support frame 104 that may engage the vertical support members 90 and be moveable therewith. An independent motor may be used to move the tarp support frame 104 vertically, or a motor used in connection with the roll 14 may be employed. The tarp application member 100 includes a number of straps 106 that are stretched between the tarp support frame 104 in order to support the tarp 102 which is generally unfolded. The trucking cargo 22 can be located under the tarp 102, and the tarp support frame 104 can be lowered so that the tarp 102 is placed on top of the trucking cargo 22. The straps 106 may be removed and the tarp 102 can be secured to the trucking cargo 22. Alternatively, the straps 106 may be used to effect attachment of the tarp 102 to the trucking cargo 22. The vehicle and trucking cargo 22 may thus move through the frame 16 until the underlayment layer 12 is properly applied, and the vehicle and trucking cargo 22 may be reversed back into the frame 16 so that the tarp 102 can be applied.

The underlayment layer 12 may be made our of a variety of materials in accordance with certain exemplary embodiments. For example, the underlayment layer 12 may be made out of plastic in accordance with certain embodiments. The underlayment layer 12 can be placed on the trucking cargo 22 in order to provide protection during transport. The underlayment layer 12 may be paced on the trucking cargo 22 in order to function as a mosisture resistance layer. The underlayment layer 12 may made of a flexible material and may be waterproof in accordance with certain exemplary embodiments. A tarp, such as a canvas tarp, can be placed on top of the underlayment layer 12 to further protect the trucking cargo 22. In accordance with other exemplary embodiments, a tarp is not placed on top of the underlayment layer.

The underlayment layer 12 may be applied to the trucking cargo 22 in the longitudinal direction so as to cover the trucking cargo 22. As used herein, including in the claims, the term "longitudinal direction" refers to the direction from the front of the vehicle to the back of the vehicle or from the back of the vehicle to the front of the vehicle. The longitudinal direction may thus be from the front of the trailer 52 to the back of the trailer 54. The longitudinal direction of the trucking cargo 22 is likewise the same in that it may also extend from the front of the trailer 52 to the back of the trailer 54, or from the back of the trailer 54 to the front of the trailer 52. The term, "transverse direction" refers to the direction from the side of the vehicle/trucking cargo 22 to the opposite side of the vehicle/trucking cargo 22. For example, the transverse direction may be from the left side of the trucking cargo 22 or trailer 20 to the right side of the trucking cargo 22 or trailer 20.

Various modifications to the above mentioned embodiments are possible. For example, with respect to the first embodiment, it may be inconvenient to start applying the underlayment layer 12 by securing the leading edge 48 proximate to the front 52 of the trailer 20. The leading edge 48 can instead be secured at the back 54 of the trailer 20. In order to apply the underlayment layer 12 over the entire trucking cargo 22, the roll 14 may then be moved towards the front 52 of the trailer 20, over the free standing structure 16. Similarly, in the second and third embodiments, the leading edge 48 may be secured proximate to the back 54 of the trailer 20 and the trucking cargo 22 may then be moved backwards in the horizontal direction 34. While the embodiments of the present invention have been described, it is to be understood that the claimed invention is not to be limited in scope to the aforementioned and described embodiments.

I claim:

1. An apparatus for applying a material layer to trucking cargo, comprising:
   a roll of a material layer;
   a rod disposed through the roll of material layer for facilitating rotation of the roll and winding and unwinding of the material layer; and
   a frame separate from the trucking cargo and a vehicle that transports the trucking cargo, wherein the frame includes a top rectangular frame portion and is configured for supporting the roll of material layer, and
   a vertical driving mechanism for moving the roll of material layer vertically with respect to the ground such that the roll of material layer is capable of being moved closer to and farther from the ground to assist in covering the trucking cargo with the material layer in a vertical direction of the trucking cargo; and
   a horizontal driving mechanism for moving the roll of material layer in a horizontal plane parallel to the ground along a length of the top rectangular frame portion and the trucking cargo in order to facilitate application of the material layer in a longitudinal direction of the trucking cargo, wherein the horizontal driving mechanism is a rack and pinion assembly.

2. The apparatus as set forth in claim 1, wherein the vertical driving mechanism capable of moving the roll of material layer vertically with respect to the ground includes a drum located on an end of the rod, a strap for engaging the drum, first and second directional rollers, and a take-up roller for engaging the strap such that rotation of the take-up roller causes the drum and rod to move vertically.

3. The apparatus as set forth in claim 1, wherein the vertical driving mechanism has a vertical driving motor configured for automatically driving the roll of material vertically with respect to the frame.

4. The apparatus as set forth in claim 1, wherein the material layer is made of plastic and is in a folded configuration when formed into the roll of material layer.

5. The apparatus as set forth in claim 1, wherein the frame is a free standing structure.

6. The apparatus as set forth in claim 1, further comprising a motor for rotationally driving the rod so as to facilitate dispensing of the material layer.

7. An apparatus for applying a material layer to trucking cargo, comprising:
   a roll of material layer;
   a rod disposed through the roll of material layer for facilitating rotation of the roll and winding and unwinding of the material layer;
   a frame separate from the trucking cargo and a vehicle that transports the trucking cargo, wherein the frame includes a top rectangular frame portion and is configured for supporting the material layer; and
   a horizontal driving mechanism for moving the roll of material layer in a horizontal plane parallel to the ground along a length of the top rectangular frame portion and the trucking cargo in order to facilitate application of the material layer to the trucking cargo in a longitudinal direction of the trucking cargo, wherein the horizontal driving mechanism includes a rack and pinion assembly.

8. The apparatus as set forth in claim 7, wherein the frame is a free standing structure.

9. The apparatus as set forth in claim 7, further comprising a motor for driving the rod disposed through a center of the roll of material layer, wherein the rod is capable of being rotationally driven through actuation of a motor so as to facilitate dispensing of the material layer.

10. An apparatus for applying a material layer to trucking cargo, comprising:
    a roll of material layer;
    a rod disposed through the roll of material layer for facilitating rotation of the roll and winding and unwinding of the material layer; and
    a frame separate from the trucking cargo and a vehicle that transports the trucking cargo, wherein the frame is configured for supporting the roll of material layer, and
    a vertical driving mechanism for moving the roll of material layer vertically with respect to the ground such that the roll of material layer is capable of being moved closer to and farther from the ground to assist in covering the trucking cargo with the material layer in a vertical direction of the trucking cargo, the vertical driving mechanism comprising: a drum located on an end of the rod; a strap for engaging the drum, first and second directional rollers, and a take-up roller for engaging the strap.

11. The apparatus for applying a material layer to a trucking cargo of claim 10, wherein the vertical driving mechanism further includes a vertical driving motor configured for automatically driving the roll of material layer vertically with respect to the frame.

* * * * *